(12) United States Patent
Akkapeddi

(10) Patent No.: US 12,386,687 B2
(45) Date of Patent: Aug. 12, 2025

(54) TECHNOLOGY AND PROTOCOL AGNOSTIC KEY-VALUE PAIR BASED USER INTERFACE AND DATA RENDERING TO SUPPORT A TRANSACTION

(71) Applicant: Bank of America Corporation, Charlotte, NC (US)

(72) Inventor: Naga Vamsi Krishna Akkapeddi, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 535 days.

(21) Appl. No.: 17/972,649

(22) Filed: Oct. 25, 2022

(65) Prior Publication Data

US 2024/0134723 A1 Apr. 25, 2024
US 2024/0231969 A9 Jul. 11, 2024

(51) Int. Cl.
*G06F 9/54* (2006.01)
(52) U.S. Cl.
CPC .................................. *G06F 9/547* (2013.01)
(58) Field of Classification Search
CPC .................................. G06F 9/547; G06F 9/54
See application file for complete search history.

(56) References Cited

U.S. PATENT DOCUMENTS

| | | | |
|---|---|---|---|
| 8,929,554 B2 | 1/2015 | Hughes et al. | |
| 10,002,153 B2 | 6/2018 | Teodorescu et al. | |
| 12,244,621 B1* | 3/2025 | Kapoor | H04L 43/045 |
| 2002/0129168 A1* | 9/2002 | Kanai | H04L 67/2876 |
| | | | 709/213 |
| 2016/0335293 A1* | 11/2016 | Teodorescu | G06F 40/216 |
| 2020/0145405 A1* | 5/2020 | Bosch | H04L 45/308 |

* cited by examiner

*Primary Examiner* — Brian W Wathen
(74) *Attorney, Agent, or Firm* — Weiss & Arons LLP

(57) ABSTRACT

Provided are methods for reducing the size of a communication between applications in a network. Methods may include receiving, at a computer processor running on a central server, a plurality of values and a plurality of keys from application A, each value paired with a respective key, and storing the values and keys on the central server. A first communication may be transmitted from application A to application B. A second communication may be transmitted from application B to application C, where applications A, B and C are running on the network. Each communication may contain one or more keys and are smaller than if they had contained corresponding values for the keys registered to application A. The computer processor may provide to applications B and C the values to the keys in the first and second communication, respectively, for example, when rendering data to a user interface.

3 Claims, 14 Drawing Sheets

300

```
1   <InvoiceMessage>
2   <HeaderDetails>
3   <Header_UniqueID>20Q1234</Header_UniqueID>
4   <Invoice_No>12345</Invoice_No>
5   <Currency>USD</Currency>
6   <Company_Code>1018</Company_Code>
7   <Document_Type>D245</Document_Type>
8   <Fiscal_Year>2021</Fiscal_Year>
9   <Vendor_Name>ABC GROUP INC</Vendor_Name>
10  <Ex_Rate>0.00004</Ex_Rate>
11  <CONTRACTID>vendor invoice</CONTRACTID>
12  </HeaderDetails>
13  <ItemDetails>
14  <Header_UniqueID>20Q1234</Header_UniqueID>
15  <Line_UniqueID>20Q1234501</Line_UniqueID>
16  <Currency>USD</Currency>
17  <Company_Code>1018</Company_Code>
18  <Posting_Key>G346</Posting_Key>
19  <Vendor_Number>0987654321</Vendor_Number>
20  <Pay_Terms>Z005</Pay_Terms>
21  <Invoice_Amount>10000.00</Invoice_Amount>
22  </ItemDetails>
```

| Data Element | Value | Key |
|---|---|---|
| Record | \<HeaderDetails\><br>\<Header_UniqueID\>20Q1234\</Header_UniqueID\><br>\<Invoice_No\>12345\</Invoice_No\><br>\<Currency\>USD\</Currency\><br>\<Company_Code\>1018\</Company_Code\><br>\<Document_Type\>D245\</Document_Type\><br>\<Fiscal_Year\>2021\</Fiscal_Year\><br>\<Vendor_Name\>ABC GROUP INC\</Vendor_Name\><br>\<CONTRACTID\>vendor invoice\</CONTRACTID\><br>\</HeaderDetails\> | A1P1 |
| Partial Payload | \<Header_UniqueID\>20Q1234\</Header_UniqueID\><br>\<Invoice_No\>12345\</Invoice_No\><br>\<Currency\>USD\</Currency\><br>\<Company_Code\>1018\</Company_Code\> | B1Q2 |
| Element | \<Header_UniqueID\>20Q1234\</Header_UniqueID\> | C1Y1 |
| Element | \<Invoice_No\>12345\</Invoice_No\> | C2Y3 |
| Data | 20Q1234 | R1K2 |
| Data | 12345 | R2K4 |
| Data | USD | R3K6 |
| Data | 2021 | R4K7 |
| Data | ABC GROUP INC | R5K8 |
| Data | vendor invoice | R6K9 |
| Metadata | \<Header_UniqueID\> | HU |
| Metadata | \<Invoice_No\> | IN |
| Metadata | \<Company_Code\> | CC |
| Metadata | \<Document_Type\> | DT |
| Metadata | \<Vendor_Name\> | VN |
| Metadata | \<CONTRACTID\> | CD |

FIG. 4

| Metadata for Creating Invoice (with no Key representation) | Metadata for Creating Invoice (with Key representation) | Metadata for Updating Invoice (with Key representation) |
|---|---|---|
| Invoice number | I1 | I1 |
| Vendor number | V1 | V1 |
| Vendor name | V2 | V2 |
| GL Account | VG | VG |
| Cost Center | VC | VC |

FIG. 14

TECHNOLOGY AND PROTOCOL AGNOSTIC KEY-VALUE PAIR BASED USER INTERFACE AND DATA RENDERING TO SUPPORT A TRANSACTION

FIELD OF TECHNOLOGY

Aspects of the disclosure relate to reducing a size of a communication in a network. Specifically, aspects of the disclosure relate to using key and value pairing to reduce the size of a communication in a network.

BACKGROUND OF THE DISCLOSURE

Many entities rely on computer networks to perform essential computations and transmit important communications. For example, financial institutions often used networks to effect transactions. Transactions in a network can be data intensive. One overall transaction can lead to many layers of transactions. Each layer may involve many applications. Each application may contain a set format of data that is added on to the communication and conveyed to the next application along with the original communication.

Completing processes such as transactions in a network may place a considerable burden of storage and processing given the large size of communications when the transaction is completed. This can slow down the processing speed of a network and increase the cost of running the network.

It would be desirable to provide systems and methods for a way to reduce the amount of information conveyed in a communication during processing and completion in the network. It would further be desirable that a solution may also increase the security of communications in the network.

SUMMARY OF THE DISCLOSURE

Apparatus and methods are herein provided to meet the above outlined objects of the invention.

Apparatus may include a system for reducing the size of a communication between applications. The system may include a network. The system may include a computer processor running on the network. The system may include a memory storage. The memory storage may be a data store. The system may include application A running on the network. The system may include application B running on the network. The system may include application C running on the network. The communication may be transmitted over the network.

The system may include the computer processor configured to receive a plurality of values and a plurality of keys from application A. Application A may pair the values and keys and send them to the computer processor. The computer processor may pair the values and the keys. The paired plurality of values and plurality of keys from application A may be referred to as being registered to application A regardless of whether application A made the pairing or the computer processor made the pairing. The system may include the computer processor configured to store the plurality of values and the plurality of keys registered to application A in the memory storage. Each value may have only one key. Each value may have two or more keys.

In an alternative embodiment, the system may store the keys registered to application A at application B.

The system may be configured to facilitate transmission of a first communication from application A to application B. The first communication may contain one or more of the plurality of keys registered to application A. The first communication may be smaller than if it had contained corresponding values for the one or more of the plurality of keys registered to application A. Smaller may mean that the communication takes up less memory storage. Smaller may mean that the communication includes less characters.

The system may be configured to facilitate transmission of a second communication from application B to application C. The second communication may contain one or more of the plurality of keys registered to application A. The second communication may be smaller than if it had contained corresponding values for the one or more of the plurality of keys registered to application A.

The network may be an organization's private network. The network may be a shared network between two or more organizations.

Each key in the plurality of keys registered to application A may be shorter than its paired value. Shorter may mean that the key includes less characters than its paired value.

The system may be configured to obtain values for keys registered to application A in a first communication between application A and application B. The system may receive an inquiry from application B, for example, when rendering data to a user interface for the corresponding values to the keys found in the first communication.

In another embodiment, the keys may be stored at application B so application B can access them without needing to access the system. For example, application B may access the keys as it processes a communication.

The system may be configured to obtain values for keys registered to application A in a second communication between application B and application C. The system may receive an inquiry from application C, for example, when rendering data to a user interface for the corresponding values to the keys found in the second communication.

In another embodiment, the keys may be stored at application C so application C can access them without needing to access the system. For example, application C may access the keys as it processes a communication.

The computer processor may be configured to receive a plurality of values and a plurality of keys from application B. Each value may be paired with a respective key. The paired plurality of values and plurality of keys from application B may be referred to as being registered to application B. Each key in the plurality of keys registered to application B may be shorter than its paired value. At least one of the keys registered to application A may be different than the keys registered to application B. The second communication may contain one or more of the plurality of keys registered to application B in addition to one or more of the plurality of keys registered to application A.

The memory space required to store the first communication which contains one or more of the plurality of keys may be 80% or less of the memory space required to store the first communication when it contains values instead of keys. The memory space of the communication with keys may be 65% or less of the memory space required to store the communication with values instead of keys. The memory space of the communication with keys may be 50% or less of the memory space required to store the communication with values instead of keys.

The memory space required to store the second communication which contains one or more of the plurality of keys may be 80% or less of the memory space required to store the second communication when it contains values instead of keys. The memory space of the communication with keys may be 65% or less of the memory space required to store the communication with values instead of keys. The memory space of the communication with keys may be 50% or less of the memory space required to store the communication with values instead of keys.

BRIEF DESCRIPTION OF THE DRAWINGS

The objects and advantages of this disclosure will be apparent upon consideration of the following detailed description, taken in conjunction with the accompanying illustrative drawings, in which like reference characters refer to like parts throughout, and in which:

FIG. 3 is a block diagram in accordance with principles of the disclosure;

FIG. 4 is a table in accordance with principles of the disclosure;

FIG. 14 is a table in accordance with principles of the disclosure.

DETAILED DESCRIPTION OF THE DISCLOSURE

Figure 1:
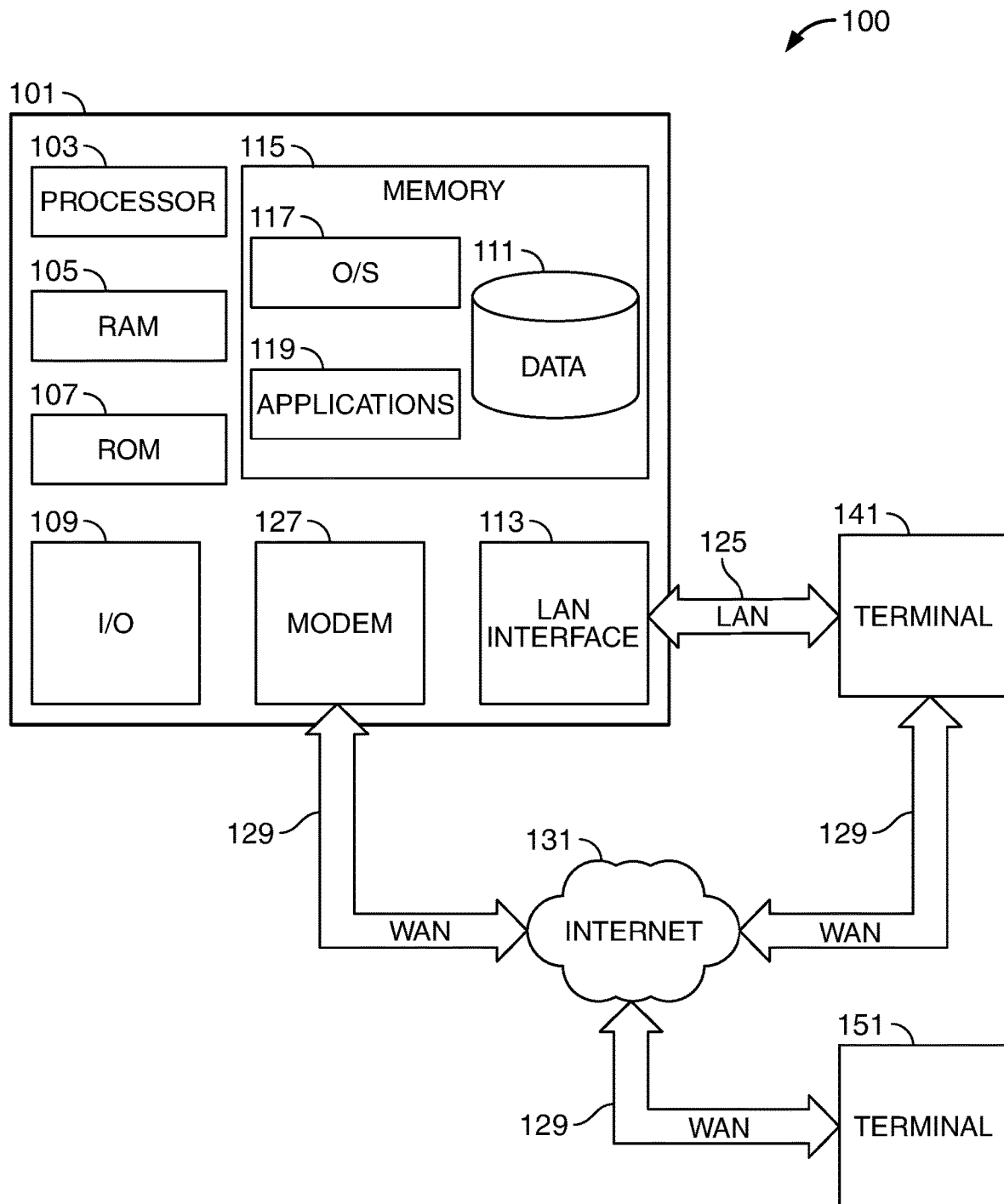
FIG. 1 is a block diagram of apparatus in accordance with principles of the disclosure.

Aspects of the disclosure relate to systems and methods for reducing the size of a communication between applications. The system may include a network. The system may include a central server running on the network. The system may include a computer processor running on the central server. The system may include a memory storage on the central server. The memory storage may be a data store. A data store may be a connection to a storage of data such as a database. The database may be on the central server. The data may be stored on a variety of files. The files may be stored on the central server. The files may be stored by one or more applications.

A communication may be a computer program. The communication may be application software.

The system may include application A running on the network. The system may include application B running on the network. The system may include application C running on the network. The communication may be transmitted over the network.

The system may include the computer processor configured to receive a plurality of values and a plurality of keys from application A. Application A may pair the values and keys and send them to the central processor. The computer processor may pair the values and the keys. The paired plurality of values and plurality of keys from application A may be referred to as being registered to application A. The system may include the computer processor configured to store the plurality of values and the plurality of keys registered to application A in the memory storage. The system may store the keys registered to application A at application B. Each value may have only one key. Each value may have two or more keys.

The system may be configured to facilitate transmission of a first communication from application A to application B. The first communication may contain one or more of the plurality of keys registered to application A. The first communication may be smaller than if it had contained corresponding values for the one or more of the plurality of keys registered to application A. Smaller may mean that the communication takes up less memory storage. Smaller may mean that the communication includes less characters.

The system may be configured to facilitate transmission of a second communication from application B to application C. The second communication may contain one or more of the plurality of keys registered to application A. The second communication may be smaller than if it had contained corresponding values for the one or more of the plurality of keys registered to application A.

The network may be an organization's private network. The network may be a shared network between two or more organizations.

Each key in the plurality of keys registered to application A may be shorter than its paired value.

The system may be configured to obtain values for keys registered to application A in a first communication between application A and application B. The system may receive an inquiry from application B, for example, when rendering data to a user interface for the corresponding values to the keys found in the first communication.

In another embodiment, the keys may be stored at application B so application B can access them without needing to access the system. For example, application B may access the key-value pairing as it processes a communication.

The system may be configured to obtain values for keys registered to application A in a second communication between application B and application C. The system may receive an inquiry from application C, for example, when rendering data to a user interface for the corresponding values to the keys found in the second communication.

In another embodiment, the keys may be stored at application C so application C can access them without needing to access the system. For example, application C may access the key-value pairing as it processes a communication.

The computer processor may be configured to receive a plurality of values and a plurality of keys from application B. Each value may be paired with a respective key. The paired plurality of values and plurality of keys from application B may be referred to as being registered to application B. Each key in the plurality of keys registered to application B may be shorter than its paired value. At least one of the keys registered to application A may be different than the keys registered to application B. The second communication may contain one or more of the plurality of keys registered to application B in addition to one or more of the plurality of keys registered to application A.

The memory space required to store the first communication which contains one or more of the plurality of keys may be 80% or less of the memory space required to store the first communication when it contains values instead of keys. The memory space of the communication with keys may be 65% or less of the memory space required to store the communication with values instead of keys. The memory space of the communication with keys may be 50% or less of the memory space required to store the communication with values instead of keys.

The memory space required to store the second communication which contains one or more of the plurality of keys may be 80% or less of the memory space required to store the second communication when it contains values instead of keys. The memory space of the communication with keys may be 65% or less of the memory space required to store the communication with values instead of keys. The memory space of the communication with keys may be 50% or less of the memory space required to store the communication with values instead of keys.

In one embodiment, an application stores a key-value pairing table on a memory. For example, the memory may be on a central server in a network. Alternatively, the application may send to the central server a list of data elements it may use. The central server may apply keys to the list of data elements and provide them back to the application for use during design. The application may send a communication which contains keys to another application. The other application may not know the values for the keys. The other application may send an inquiry to the central server to obtain values for keys it wants to decipher.

In another embodiment, applications may share a key-value pairing table for data elements. For example, the applications may make a design agreement between themselves agreeing to the key-value pairing. In one aspect, when one application creates a communication, it may assign keys to various data elements. In another aspect, when one application receives a communication, processes it, and transmits it to another application, it may assign keys to various data elements. The receiving application may already have the key-value pairing table stored in its memory. The receiving application may substitute values for keys as it processes the communication. Agreeing to a key-value pairing in advance, for example as a design agreement, may provide for efficient processing of a communication with keys. For example, applications sharing the key-value pairing may avoid a need to seek values for keys from a remove processor accessing a remote computer storage.

Either of the previous embodiments as well as other embodiments provide advantages over not using key-value pairing.

One advantage may be a reduction in storage space occupied by a communication. Using a key-value pairing may reduce the size of a communication. Storing the communication may occupy less memory storage due to the reduce size of the communication.

Another advantage may be to use computer resources more efficiently. As a communication increases in size, more sophisticated processing and storage equipment may be required to maintain system functionality. If the system functions too slowly or shuts down due to a high burden on its processing, users may not utilize the system. Users may move over to other system, which may be undesirable for a system provider.

A further advantage may be to increase a speed of processing on a network. If an application is processing a program that needs to run quickly, using keys may help achieve the goal of quick processing. Virtual reality may be an example that requires real-time processing speed. A user may not utilize a virtual reality application if the responsiveness of the application is slower than real-time. Real-time may be understood to mean a processing time where the user does not notice any delay in processing time between an input and an output.

Another advantage may be enhancing a security of communications over a network. If a communication with keys is intercepted, it may be challenging for a malicious party to decipher the meaning of the communication.

A further advantage is when a communication contains a large amount of data elements such as data, metadata, elements, partial payloads, and records that may not be utilized when an application receives the communication. Assigning keys to some or all the data elements may lead to a significant decrease in the size of the communication. Since only some of the keys may need deciphering, processing time spent to decipher the keys may be less that processing time that would have been required to transmit a larger communication.

Described are illustrative embodiments of apparatus and methods in accordance with the principles of the invention with reference to the accompanying illustrative drawings, which form a part hereof. Utilizing other embodiments, and structural, functional, and procedural modifications may stay within the scope and spirit of the present invention.

The drawings show illustrative features of apparatus and methods in accordance with the principles of the invention. The drawings show illustrative features in the context of selected embodiments. One may practice, in accordance with the principles of the invention, one of the embodiments along with features shown in connection with another of the embodiments.

Apparatus and methods described herein are illustrative. Apparatus and methods of the invention may involve some or all the features of the illustrative apparatus and/or some or all the steps of the illustrative methods. One may perform the steps of the methods in an order other than the order shown or described herein. Some embodiments may omit steps shown or described in connection with the illustrative methods. Some embodiments may include steps that are not shown or described in connection with the illustrative methods but shown or described in a different portion of the specification.

One of ordinary skill in the art will appreciate that one may perform the steps shown and described herein in other than the recited order and that one or more steps illustrated may be optional. The methods of the above-referenced embodiments may involve the use of any suitable elements, steps, computer-executable instructions, or computer-readable data structures. In this regard, disclosed are other embodiments as well that can be partially or wholly implemented on a computer-readable medium, for example, by storing computer-executable instructions or modules or by utilizing computer-readable data structures.

FIG. 1 shows an illustrative block diagram of system 100 that includes computer 101. One may refer to Computer 101 as an "engine," "server" or "computing device." Computer 101 may be a workstation, desktop, laptop, tablet, smart phone, or any other suitable computing device. One may use elements of system 100, including computer 101, to implement various aspects of the systems and methods disclosed herein.

Computer 101 may have processor 103 for controlling operation of the device and its associated components, and may include RAM 105, ROM 107, input/output module 109, and non-transitory/non-volatile machine-readable/writeable memory 115. One may configure machine-readable/writeable memory to store information in machine-readable/writeable data structures. Processor 103 may also execute all software running on the computer—e.g., an operating system and/or voice recognition software. Other components commonly used for computers, such as EEPROM or Flash memory or any other suitable components, may also be part of computer 101.

Memory 115 may be comprised of any suitable permanent storage technology—e.g., a hard drive. Memory 115 may store software including operating system 117 and application program(s) 119 along with any data 111 needed for operation of system 100. Memory 115 may also store videos, text, and/or audio assistance files. One may store data in memory 115, in cache memory, or in any other suitable memory.

Input/output ("I/O") module 109 may include connectivity to a microphone, keyboard, touch screen, mouse, and/or stylus. One may provide input into computer 101 through these I/O modules. The input may include input relating to cursor movement. I/O 109 may also include one or more speakers for providing audio output and a video display device for providing textual, audio, audiovisual, and/or graphical output. The input and/or output may be related to computer application functionality.

One may connect System 100 to other systems via local area network (LAN) interface (or adapter) 113. System 100 may operate in a networked environment supporting connections to one or more remote computers, such as terminals 141 and 151. Terminals 141 and 151 may be personal computers or servers that include many or all the elements described above relative to system 100. Network connections depicted in FIG. 1 include a local area network (LAN) 125 and a wide area network (WAN) 129 but may also include other networks. One may connect computer 101 to LAN 125 through LAN interface (or adapter) 113 when using a LAN networking environment. When used in a WAN networking environment, computer 101 may include modem 127 or other means for establishing communications over WAN 129, such as Internet 131.

One appreciates that the network connections shown are illustrative. One may use other means of establishing a communications link between computers. One may presume the existence of various well-known protocols such as TCP/IP, Ethernet, FTP, HTTP, and the like. One may operate the system in a client-server configuration to permit retrieval of data from a web-based server or API. One may understand that web-based, for the purposes of this application, includes a cloud-based system. The web-based server may transmit data to any other suitable computer system. The web-based server may also send computer-readable instructions, together with data, to any suitable computer system. The computer-readable instructions may be to store data in cache memory, the hard drive, secondary memory, or any other suitable memory.

Additionally, one may use application program(s) 119 on computer 101. These programs may include computer executable instructions for invoking functionality related to communication, such as e-mail, Short Message Service (SMS), and voice input and speech recognition applications. One may refer to application program(s) 119 (alternatively, "plugins," "applications," or "apps") to include computer executable instructions for invoking functionality related to performing various tasks. Application program(s) 119 may utilize one or more algorithms that process received executable instructions, perform power management routines or other suitable tasks. Application program(s) 119 may utilize one or more decisioning processes for the processing of calls received from calling sources as detailed herein.

Application program(s) 119 may include computer executable instructions (alternatively referred to as "programs"). Embodied in hardware or firmware (not shown) may be the computer executable instructions. Computer 101 may execute the instructions embodied by the application program(s) 119 to perform various functions.

Application program(s) 119 may utilize the computer-executable instructions executed by a processor. Programs include routines, programs, objects, components, data structures, etc. that perform tasks or implement abstract data types. A computing system may be operational with distributed computing environments. Remote processing may perform tasks on devices linked through a communications network. In a distributed computing environment, a program may be in both local and remote computer storage media including memory storage devices. Computing systems may rely on a network of remote servers hosted on the Internet to store, manage, and process data (e.g., "cloud computing" and/or "fog computing").

Stored in memory 115 is any information described above in connection with database 111, and any other suitable information. One or more of application program(s) 119 may include one or more algorithms used to add data and metadata to a database, identify a type of form being used, predict fields in a document, identify changes between documents, provide changes to an entity to ascertain if an error is present, identify fraud concerns, communicate fraud concerns to interested parties within an organization, and provide documents for providing to a regulatory authority.

One may describe the invention in the context of computer-executable instructions, such as application program (s) 119, for execution by a computer. Programs may include routines, programs, objects, components, and data structures, which perform tasks or implement data types. One may practice the invention in distributed computing environments. One may perform tasks by remote processing devices, linked through a communications network. In a distributed computing environment, programs may be in both local and remote computer storage media including memory storage devices. One may consider such programs, for the purposes of this application, as engines with respect to the performance of the program-assigned tasks.

Computer 101 and/or terminals 141 and 151 may also include various other components, such as a battery, speaker, and/or antennas (not shown). One may link components of computer system 101 by a system bus, wirelessly or by other suitable interconnections. Components of computer system 101 may be present on one or more circuit boards. In some embodiments, the components may be integrated into a single chip. The chip may be silicon-based.

Terminal 151 and/or terminal 141 may be portable devices such as a laptop, cell phone, Blackberry™, tablet, smartphone, or any other computing system for receiving, storing, transmitting and/or displaying relevant information. Terminal 151 and/or terminal 141 may be one or more user devices. Terminals 151 and 141 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
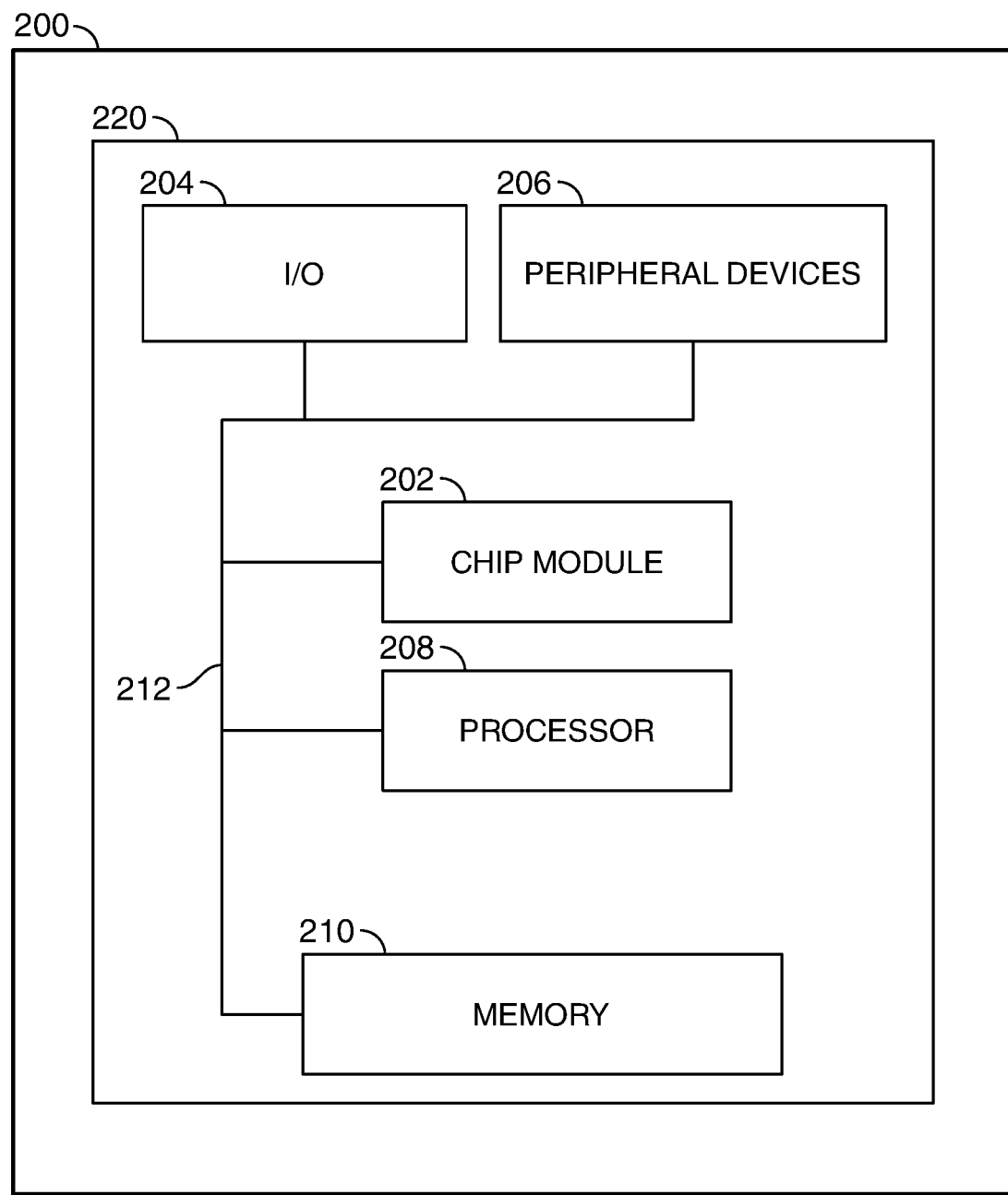
FIG. 2 is another block diagram of apparatus in accordance with principles of the disclosure.

FIG. 2 shows an illustrative block diagram of apparatus 200. One may configure apparatus 200 in accordance with the principles of the disclosure. Apparatus 200 may be a computing device. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of data; and machine-readable/writeable memory 210.

One may configure machine-readable/writeable memory 210 to store information in machine-readable/writeable data structures, such as: machine executable instructions (for example, "computer instructions" or "computer code"); applications, signals; and/or any other suitable information or data structures.

One may couple together components 202, 204, 206, 208 and 210 by system bus (or other interconnections) 212 and may be present on one or more than one circuit board 220. In some embodiments, the components may be integrated into a single chip. The chip may be silicon-based.

FIG. 3 illustrates a sample section 300 of a communication between applications in a system. A system may be applications within one network. A system may be applications across networks. Sample section 300, for example, shows data, metadata, elements, and records that may be used for creating an invoice in a transaction. Data and metadata which may make up an element are shown. For example, the following may be an element <Header_UniqueID>20Q1234</Header_UniqueID> which is made up of metadata <Header_UniqueID> and data 20Q1234. Multiple elements together may form a record. For example, the record may start with <HeaderDetails> and ends with </HeaderDetails>.

FIG. 4 illustrates a grouping of key-value pairings in the form of a table 400. Data elements listed in table 400 include a record, a partial payload, for example, a partial payload found in a record, elements, for example, data preceded by and followed by metadata, data, and metadata. Table 400 shows examples of values and keys for each of these data elements.

Figure 5:
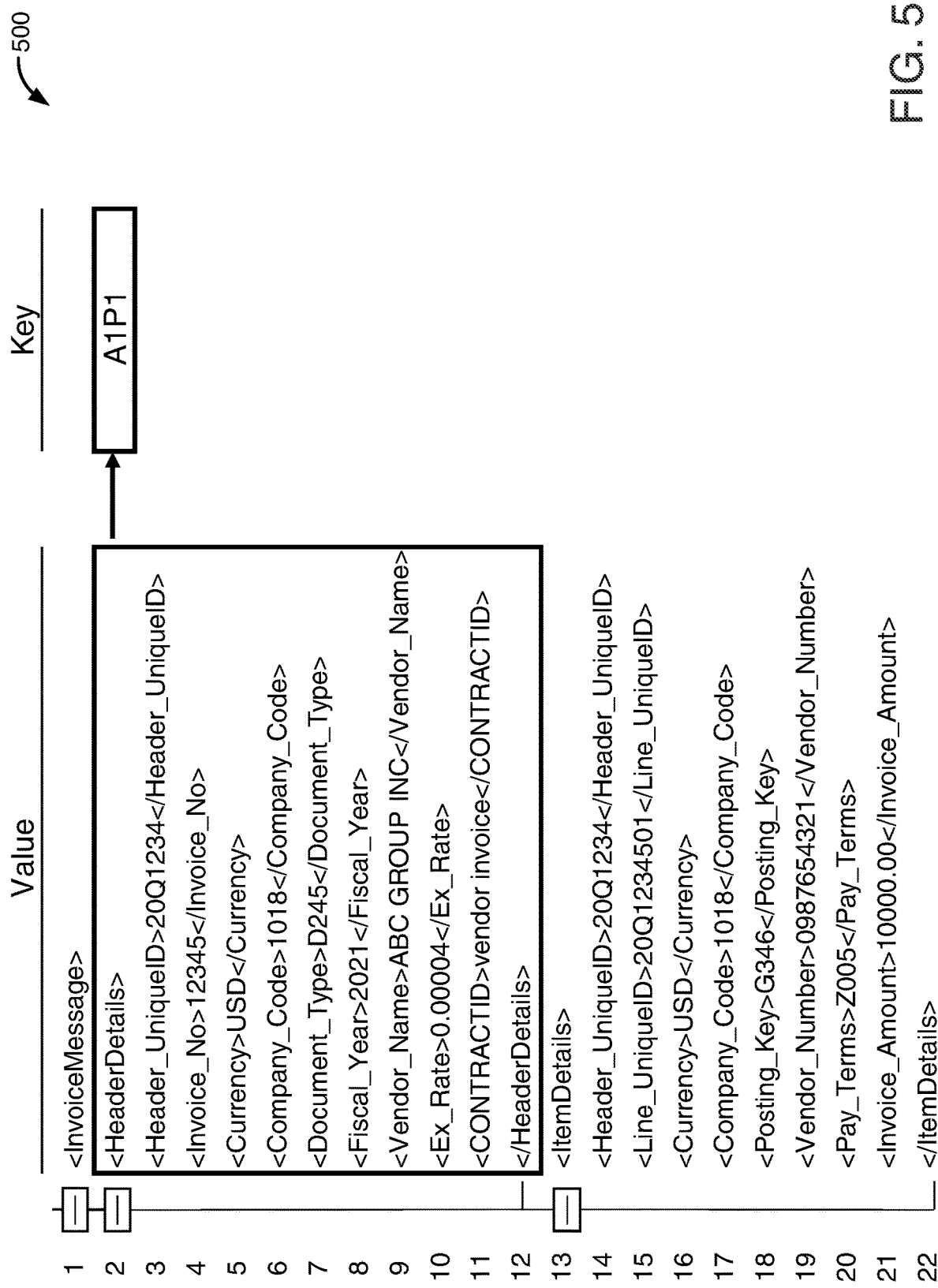
FIG. 5 is a block diagram in accordance with principles of the disclosure.

FIG. 5 illustrates a sample section of a communication 500 between applications in a system. Illustrated in the sample communication 500 is a data element in the form of a record which starts with <HeaderDetails> and ends with </HeaderDetails>. The entire record may form a value which key A1P1 may replace. In this example, substituting a key for the value may lead to a significant reduction in the length of the communication. For example, one key of four characters may replace eleven lines of the communication.

Figure 6:
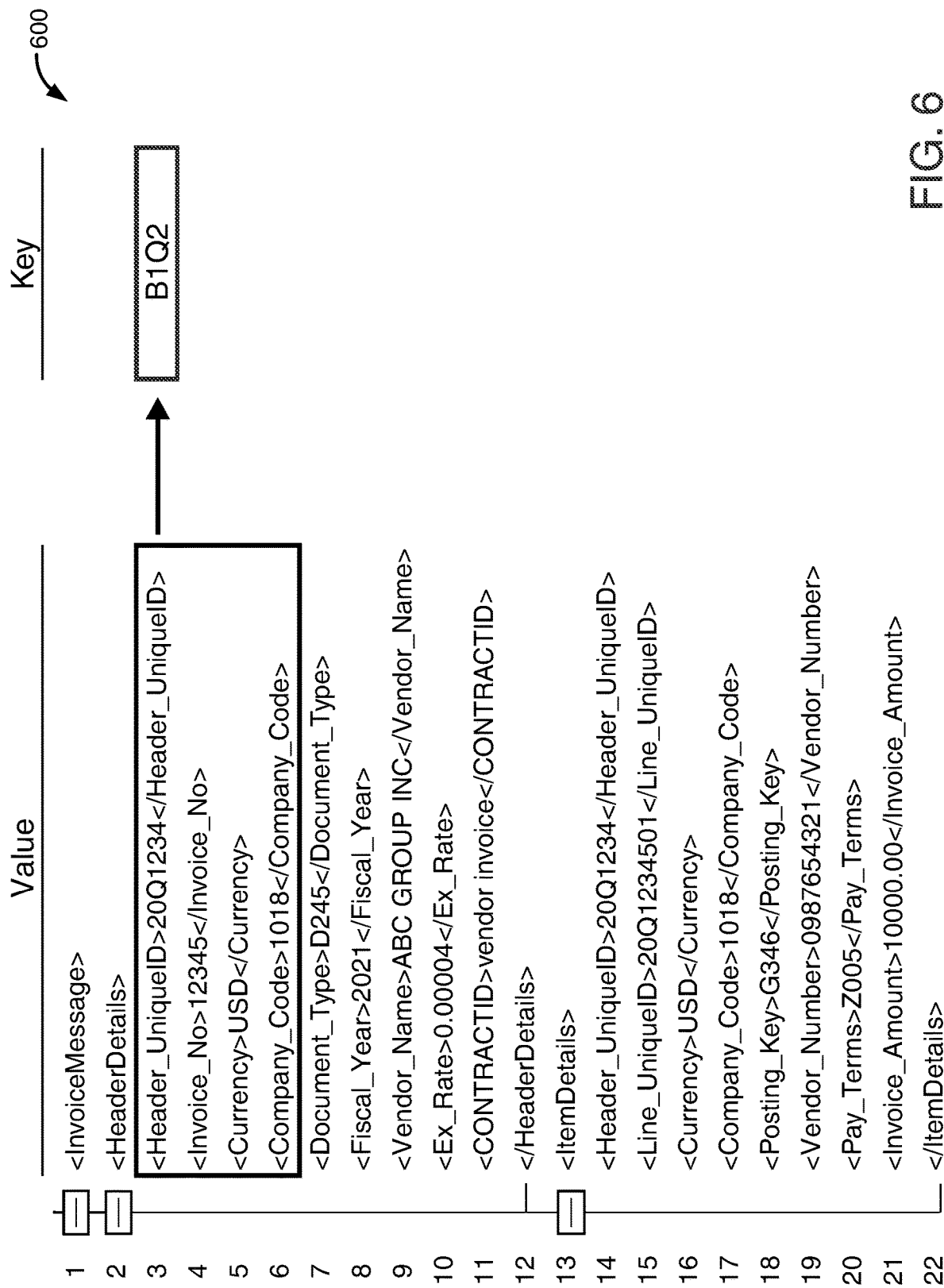
FIG. 6 is a block diagram in accordance with principles of the disclosure.

FIG. 6 illustrates a sample section of a communication 600 between applications in a system. Illustrated in the sample communication 600 is a data element in the form of a partial payload. In this example, the data element is a partial payload of a record which starts with the element <Header_UniqueID>20Q1234</Header_UniqueID> and ends with the element <Company_Code>1018</Company_Code>. The entire record may form a value which key B1Q2 may replace. In this example, substituting a key for the value may lead to a significant reduction in the length of the communication. For example, one key of four characters may replace four lines of the communication.

Figure 7:
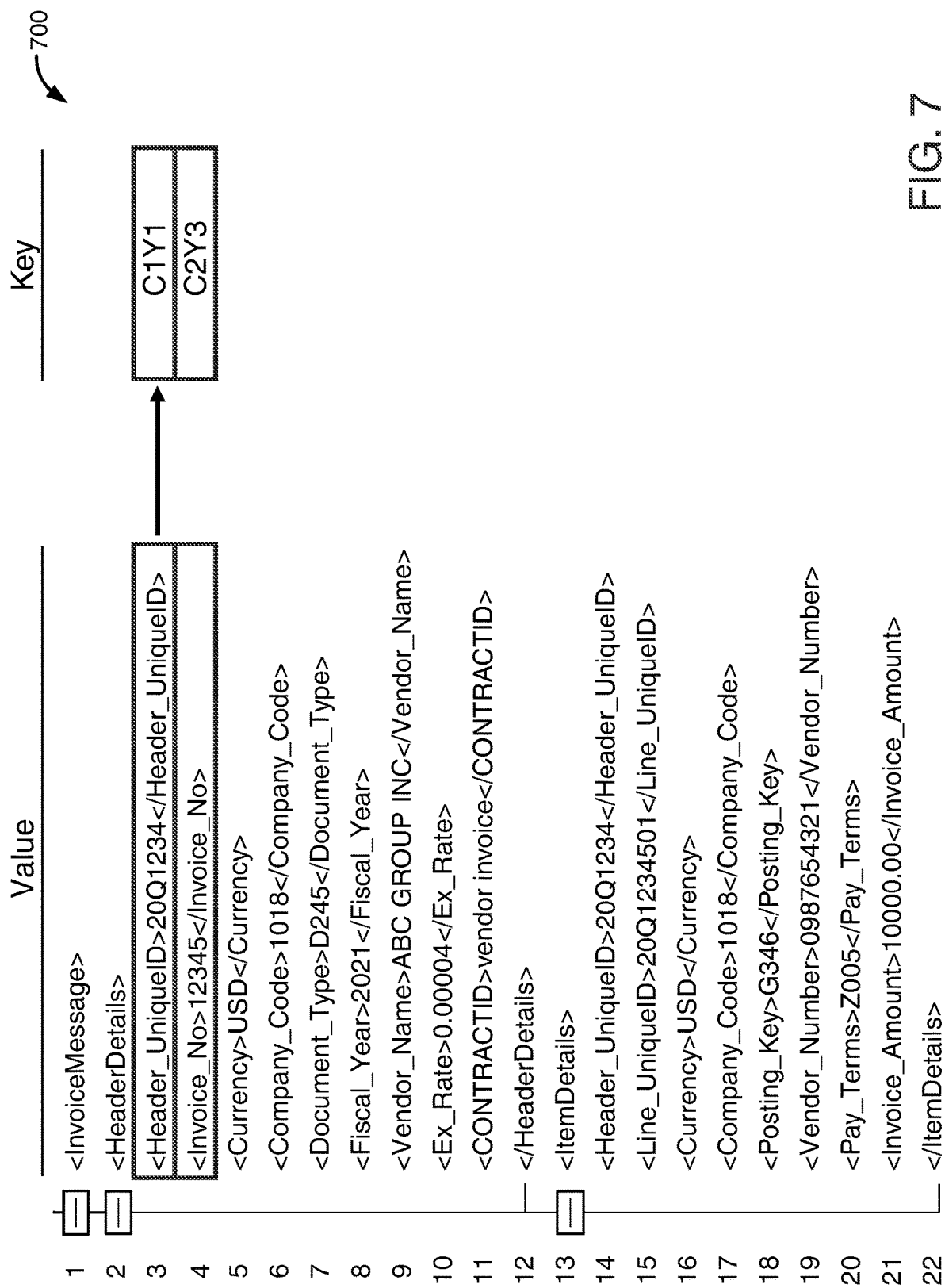
FIG. 7 is a block diagram in accordance with principles of the disclosure.

FIG. 7 illustrates a sample section of a communication 700 between applications in a system. Illustrated in the sample communication 700 are data elements in the form of elements. One example of an element is <Header_UniqueID>20Q1234</Header_UniqueID>. The element may form a value which key C1Y1 may replace. In this example, substituting a key for the value may lead to a significant reduction in the length of the communication. For example, a four-character key may replace a thirty-seven-character value.

Figure 8:
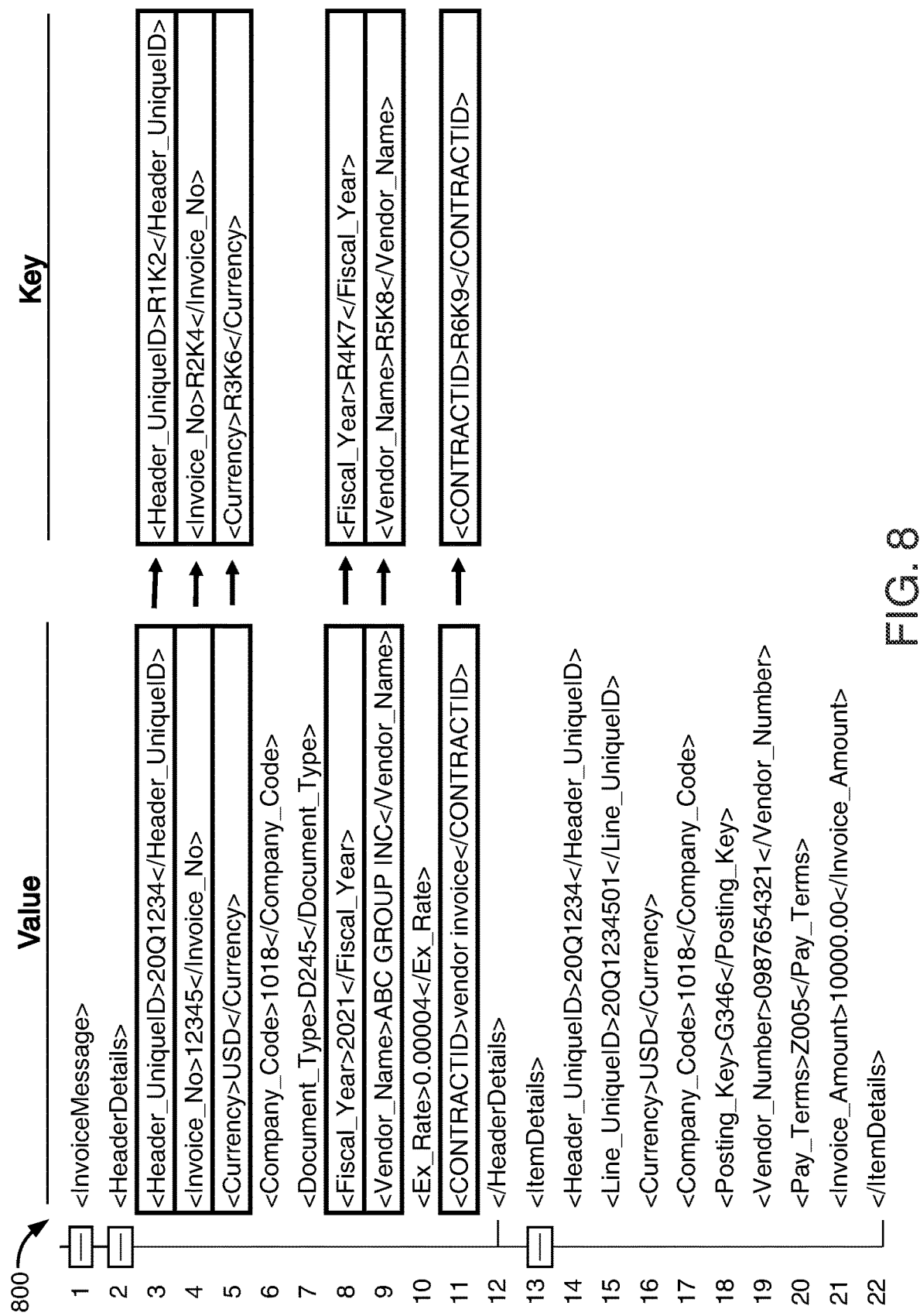
FIG. 8 is a block diagram in accordance with principles of the disclosure.

FIG. 8 illustrates a sample section of a communication 800 between applications in a system. Illustrated in the sample communication 800 are data elements in the form of data. One example of data is 20Q1234, which is part of the element <Header_UniqueID>20Q1234</Header_UniqueID>. The data may form a value which key R1K2 may replace. Data with the key may be seen in the following element <Header_UniqueID>R1K2</Header_UniqueID>. In this example, substituting a key for the value may lead to a significant reduction in the length of the communication. For example, a four-character key may replace a seven-character value.

Figure 9:
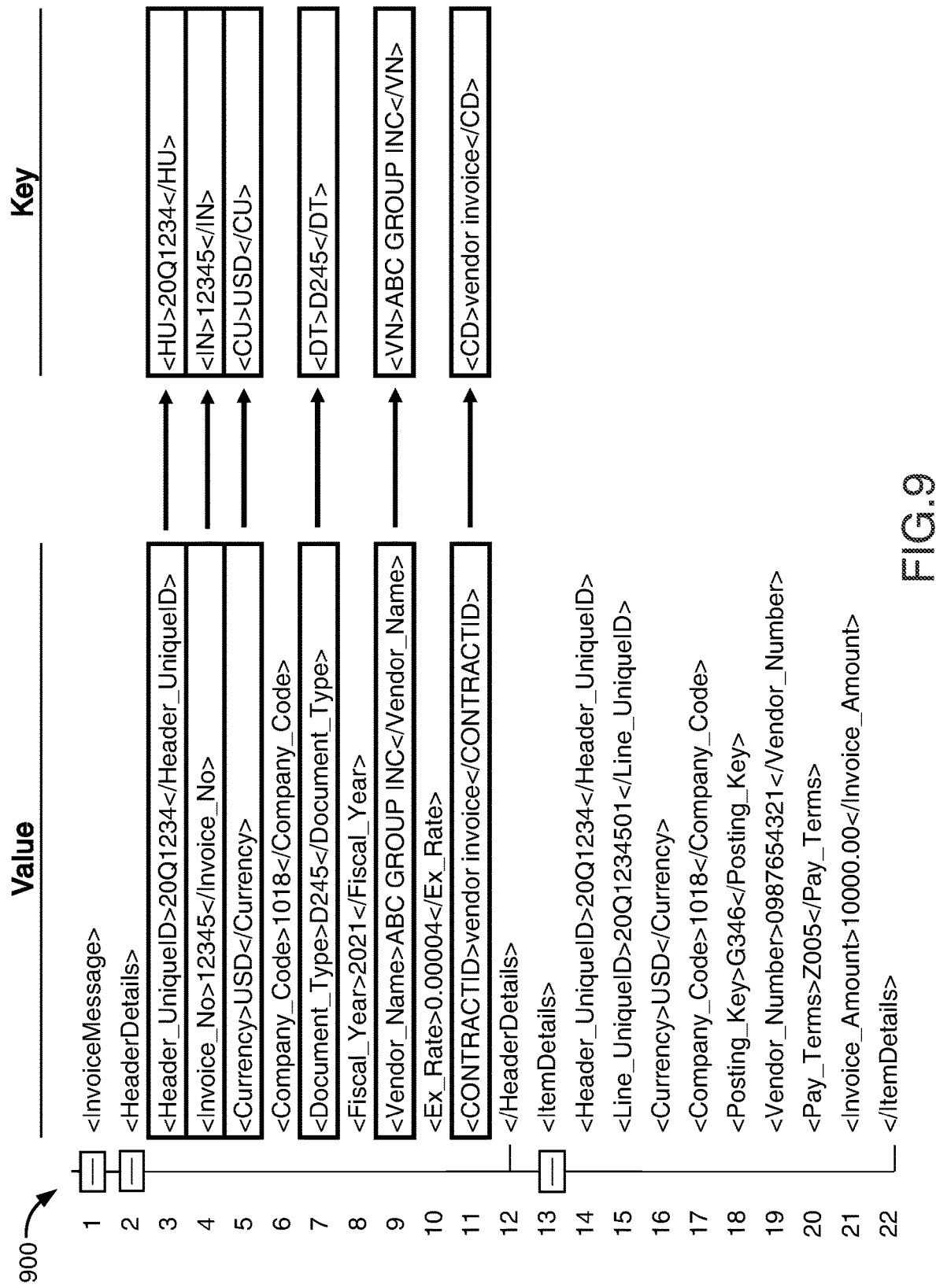
FIG. 9 is a block diagram in accordance with principles of the disclosure.

FIG. 9 illustrates a sample section of a communication 900 between applications in a system. Illustrated in the sample communication 900 are data elements in the form of metadata. One example of metadata is Header_UniqueID, which is part of the element <Header_UniqueID>20Q1234</Header_UniqueID>. The metadata may form a value which key HU may replace. The element with the metadata key may be <HU>20Q1234</HU>. In this example, substituting a key for the value may lead to a significant reduction in the length of the communication. For example, four characters of keys may replace thirty characters of values.

Figure 10:
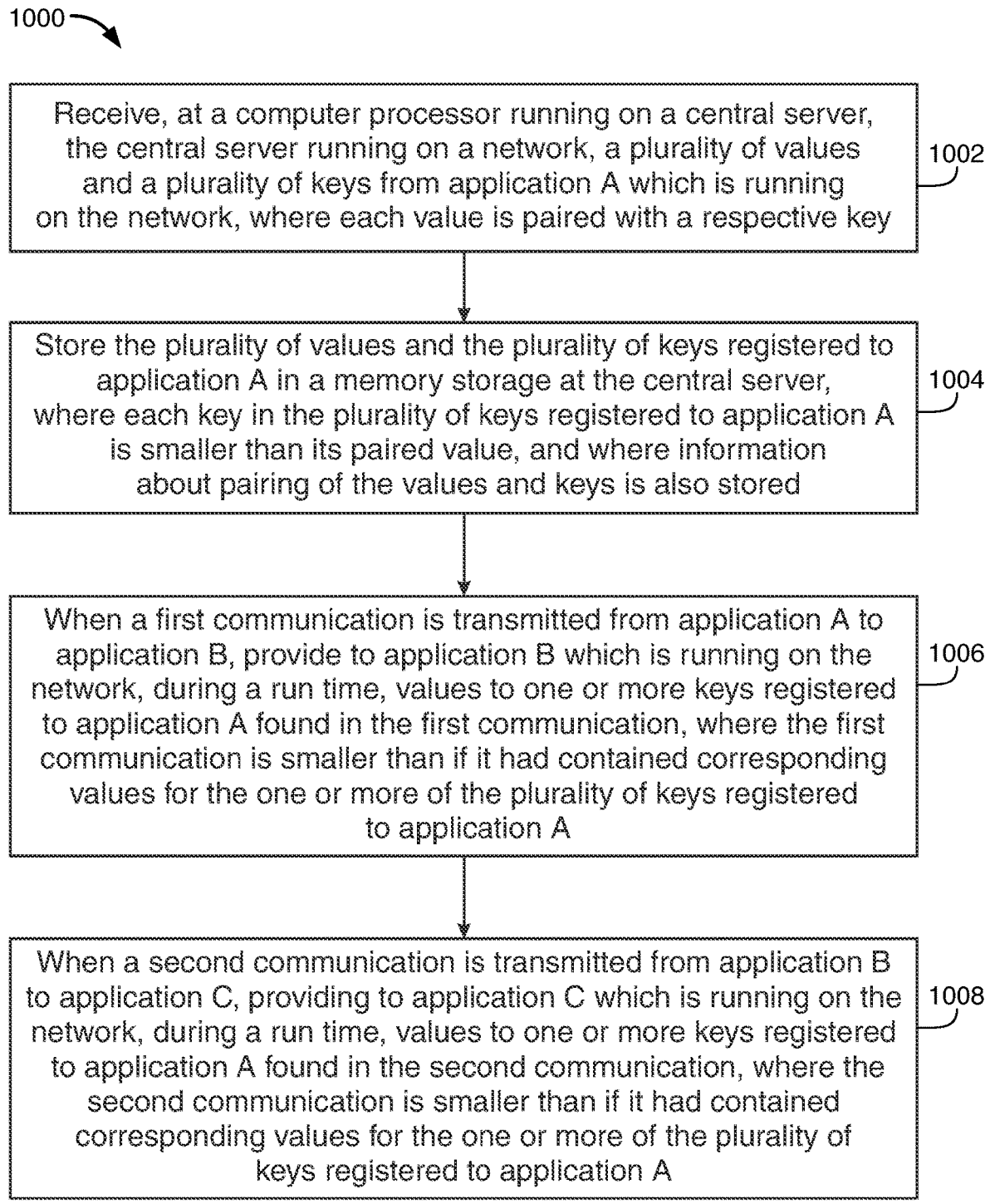
FIG. 10 is a flowchart of a process in accordance with principles of the disclosure.

FIG. 10 shows illustrative flow chart 1000 of method steps for reducing a size of a communication between applications.

Flow chart 1000 is depicted as starting at step 1002. At step 1002, a computer processor running on a central server may receive a plurality of values and a plurality of keys from application A. Application A may run on the network. Each value of the plurality of values may be paired with a key from the plurality of keys.

At step 1004, the computer processor may store the plurality values and the plurality of keys registered to application A in a memory storage at the central server. The storage may include information about the pairing of the values and keys. Each key may be shorter than its paired value.

At step 1006, a first communication may be transmitted from application A to application B, over the network. The processor may provide application B, for example, when rendering data to a user interface, values to one or more keys registered to application A found in the first communication. The key-containing first communication may be smaller than if it had contained corresponding values for the one or more of the plurality of keys registered to application A.

Smaller may mean that the communication takes up less memory storage. Smaller may mean that the communication includes less characters.

At step 1008, a second communication may be transmitted from application B to application C, over the network. The processor may provide application C, for example, when rendering data to a user interface, values to one or more keys registered to application B found in the second communication. The key-containing second communication may be smaller than if it had contained corresponding values for the one or more of the plurality of keys registered to application A.

Figure 11:
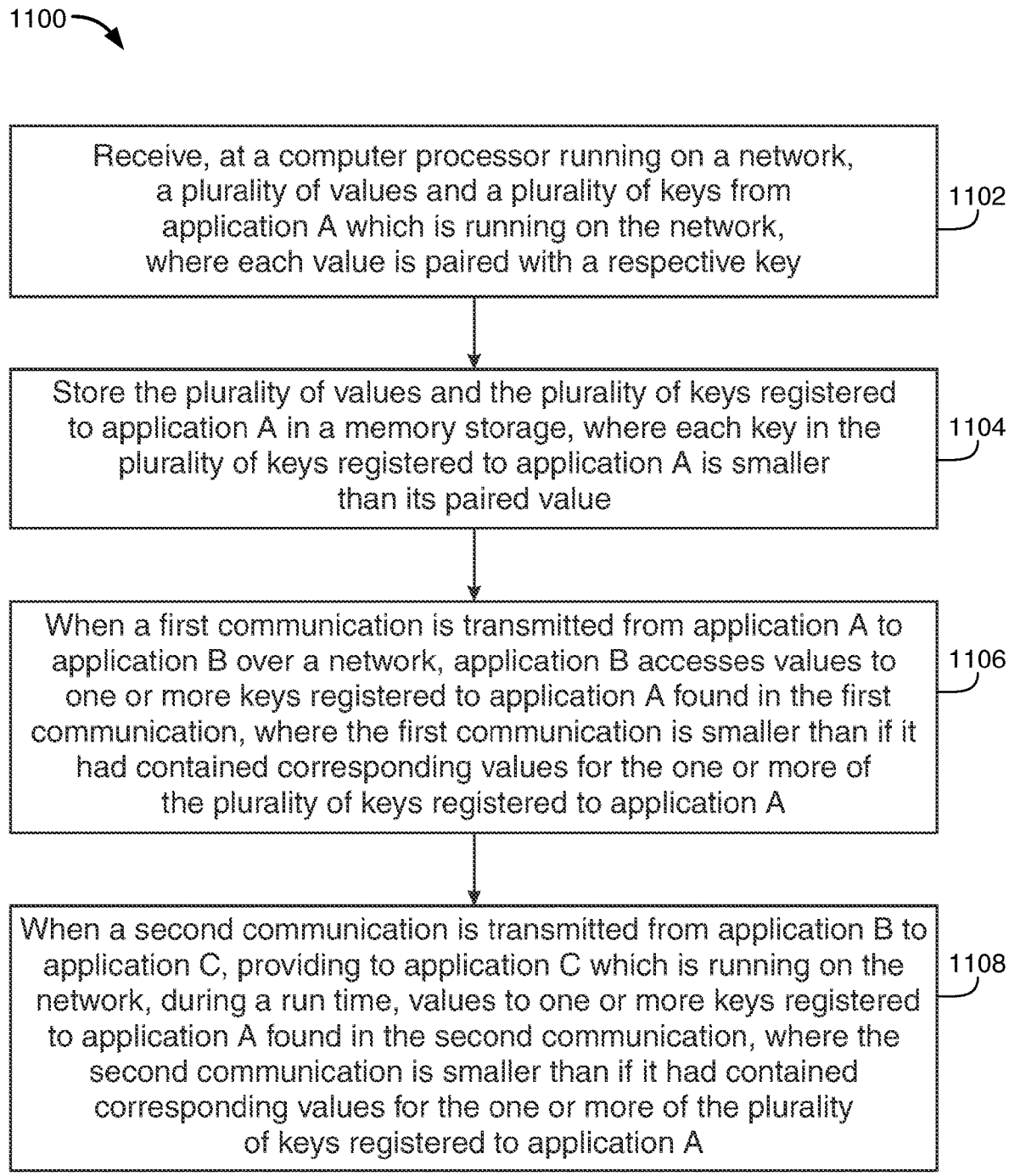
FIG. 11 is a flowchart of a process in accordance with principles of the disclosure.

FIG. 11 shows illustrative flow chart 1100 of method steps for reducing a size of a communication between applications.

Flow chart 1100 is depicted as starting at step 1102. At step 1102, a computer processor running on a network may receive a plurality of values and a plurality of keys from application A. Application A may run on the network. Each value of the plurality of values may be paired with a key from the plurality of keys.

At step 1104, the computer processor may store the plurality values and the plurality of keys registered to application A in a memory storage. The storage may include information about the pairing of the values and keys. Each key may be shorter than its paired value. Application B may be in proximity to the memory storage. The same processor may be in electronic communication with the memory storage and run application B. Application B may access the key-value pairing, for example, when it is processing the communication.

At step 1106, a first communication may be transmitted from application A to application B over the network. The processor may provide application B, for example, when rendering data to a user interface, values to one or more keys registered to application A found in the first communication. The processor running application B may have the value-key pairing stored in its memory storage and may access the values for keys in the first communication at any time. The key-containing first communication may be smaller than if it had contained corresponding values for the one or more of the plurality of keys registered to application A.

At step 1108, a second communication may be transmitted from application B to application C over the network. The processor may provide application C, for example, when rendering data to a user interface, values to one or more keys registered to application A found in the second communication. The processor running application C may have the value-key pairing stored in its memory storage and may access the values for keys in the second communication at any time. The key-containing second communication may be smaller than if it had contained corresponding values for the one or more of the plurality of keys registered to application A.

Figure 12:
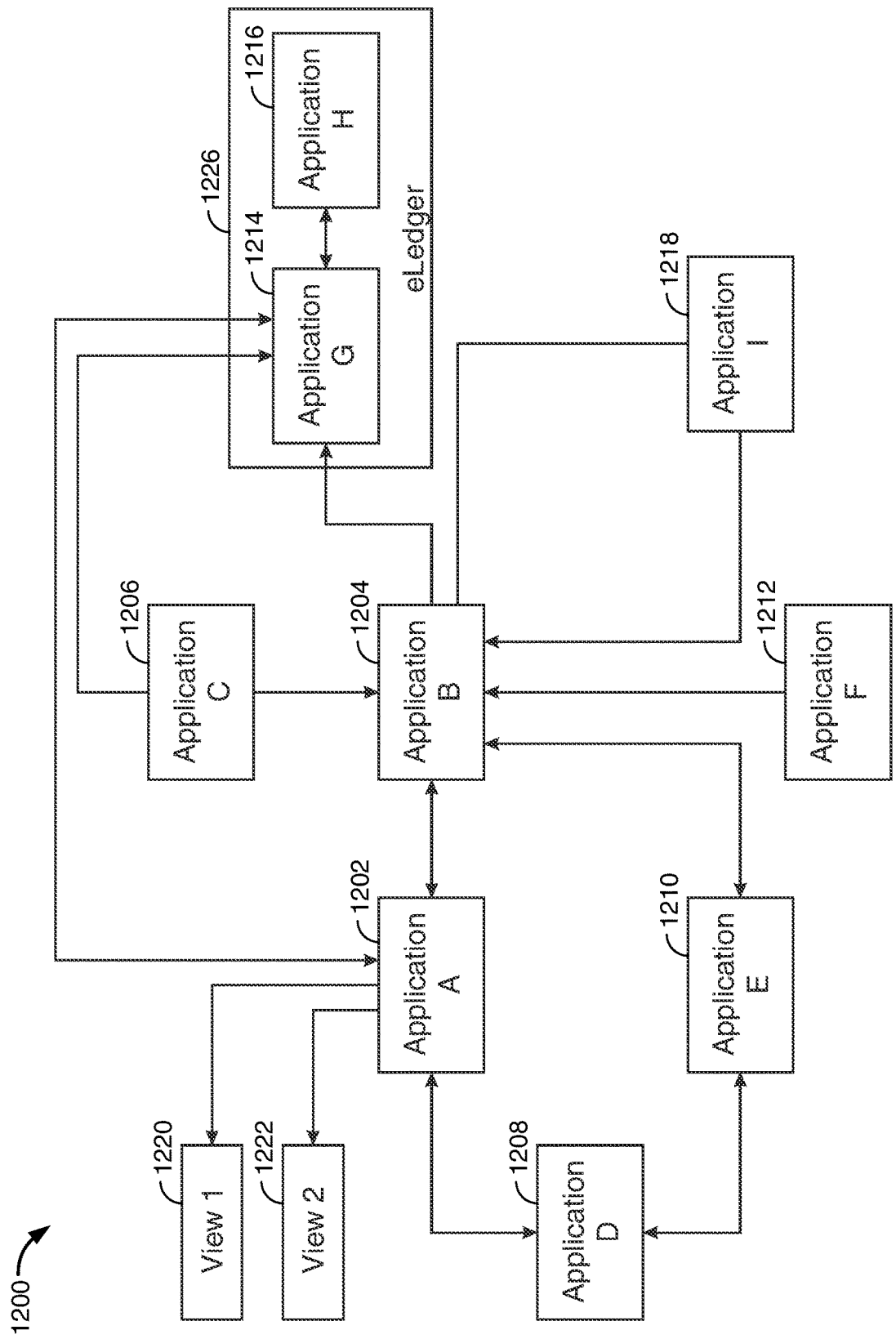
FIG. 12 is a block diagram of apparatus in accordance with principles of the disclosure.

FIG. 12 illustrates how a communication may become large as it may add many data elements during a communication through a system 1200. For example, a processor may initiate a communication to complete a transaction. The communication may contain data elements. As the communication proceeds through the application in system 1200, the communication may add additional data elements. A system that sends a communication through many applications may become very large as each additional application may add data elements to the communication. Large communications may place a burden on the processing and storage resources of the system. This burden may manifest as slower processing times. It may manifest in the form of system shutdown do to processing overload.

System 1200 may illustrate a generation of an invoice. The communication may begin at Application A 1202. Application A may send a communication to Application B 1204, indicating that a new invoice is being generated and seeking data and metadata to populate the invoice. Application B may obtain data and metadata from Application C 1206, Application E 1210, Application F 1212, and Application G 1214. Application B may also obtain specific customer data from a Cloud impute module at Application 11218. Application B may provide the obtained data and metadata to Application A.

Application E may send a communication to Application D 1208, to obtain an appropriate invoice document form. Application D may provide Application E and Application A with data and metadata for an appropriate form as part of the communication. Application A may provide a view of data to View 1 1220. Application A may provide a view of data to View 3 1222.

Application B may provide the final invoice to Application G on the eLedger 1226. Application G may store the final invoice on Application H 1216. When the communication finally reaches the stage of being stored on Application H, there may be ten, twenty, or more additions of data elements from all the applications involved in the communication. This may lead to very large files that need to be transmitted and stored. Use of keys to substitute for values in data elements may lead to a significant reduction in a burden placed on the system. Less system burden may lead to faster communication times. Less system burden may lead to reduced cost for system equipment.

Figure 13:
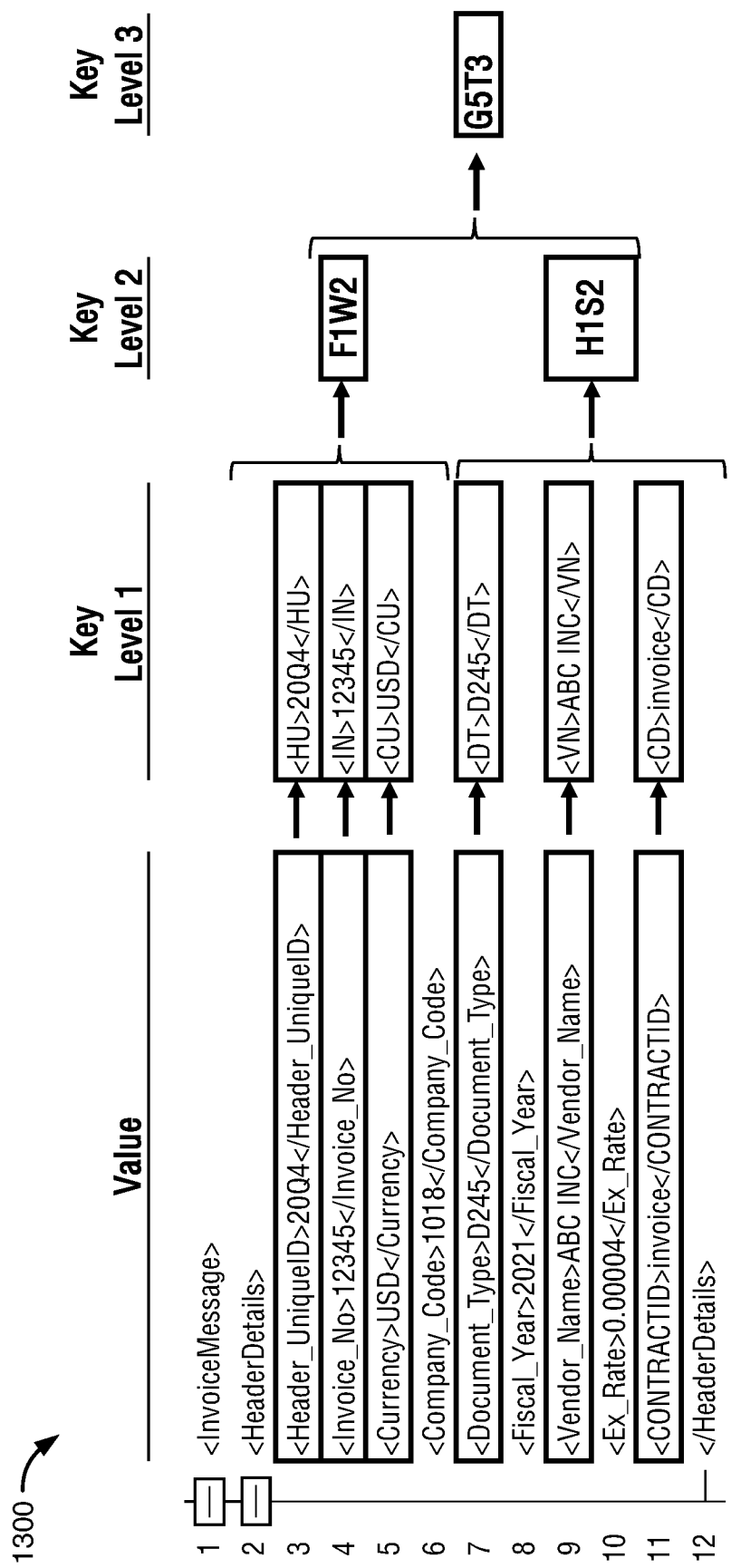
FIG. 13 is a block diagram in accordance with principles of the disclosure.

FIG. 13 illustrates a sample section of a communication 1300 between applications in a system. Illustrated in the sample communication 1300 are levels of keys. A communication may contain nested keys. Nested keys may lead to reduced size of communication. Nested keys may lead to enhanced security. As a communication proceeds from one application to another and the size of the communication grows, nested keys may facilitate managing the size of the communication. For example, in communication 1300, key level 1 data elements may be in the form of metadata. One example of a metadata element is Header_UniqueID, which is part of the element <Header_UniqueID>20Q1234</Header_UniqueID>. The data element may form a value which key HU may replace. The data element with the key may be <HU>20Q1234</HU>. In this example, keys are uses to replace metadata in six elements.

Key level 2 data elements may be in the form of partial payloads. The same application that assigned key level 1 data elements may assign key level 2 data elements. Different applications may assign the different key level data elements.

Key level 3 data elements may be in the form of a record. The same application that assigned key level 1 data elements or key level 2 data elements may assign key level 3 data elements. Different applications may assign the different key level data elements.

A key-value pairing table to convert keys into values may be stored on a central server in a network. A processor on the central server may provide the values to the keys upon a request from an application such as an application receiving the communication. The request may be sent, for example, when the application is rendering data to a user interface.

A computer processor may store a key-value pairing table on a memory storage in proximity to an application. When the application receives a communication containing keys, the application may provide values for the keys as part of processing the communication.

FIG. 14 illustrates a utilization of similar key-value pairings of metadata across a variety of transaction types. For example, an application may support multiple transaction types with similar metadata used in each transaction type. Rather than publishing metadata for each transaction type, the application may use key-value pairing from one transaction type for another transaction type. For example, a key-value pairing is designated for metadata for creation of an invoice includes Invoice Number, Vendor Number, Vendor Name, GL Account, and Cost Center. Instead of making another key-value pairing for updating an invoice, the application may instead reference the key-value pairing used for the creation of an invoice. For example, the keys for metadata from the creation of an invoice may be utilized as keys for the metadata in updating an invoice. A similar approach may be used for other data elements when the data element for one transaction type is like the data elements for the other transaction type.

Presented herein are systems and methods for using key-value pairing to reduce a size of a communication between applications. Persons skilled in the art may practice the present invention in other than the described embodiments. Presented are embodiments for purposes of illustration rather than of limitation. Only the claims that follow limit the present invention.

What is claimed is:

1. A system for reducing a size of a communication between applications, the system comprising:
   a network;
   a central server running on the network;
   a computer processor running on the central server;
   a memory storage on the central server;
   application A running on the network;
   application B running on the network; and
   application C running on the network;
   wherein the computer processor is configured to:
      receive a plurality of values and a plurality of keys from application A, where each value is paired with a respective key; and
      store the plurality of values and the plurality of keys registered to application A in the memory storage;
   wherein:
      a first communication is transmitted from application A to application B;
      the first communication contains one or more of the plurality of keys registered to application A; and
      the first communication is smaller than if it had contained corresponding values for the one or more of the plurality of keys registered to application A;
   wherein:
      a second communication is transmitted from application B to application C;
      the second communication contains one or more of the plurality of keys registered to application A; and
      the second communication is smaller than if it had contained corresponding values for the one or more of the plurality of keys registered to application A; and
   wherein:
      application B obtains from the central server, when rendering data to a user interface, values to one or more keys registered to application A found in the first communication.

2. A system for reducing a size of a communication between applications, the system comprising:
   a network;
   a computer processor running on the network;
   a memory storage;
   application A running on the network;
   application B running on the network; and
   application C running on the network;
   wherein the computer processor is configured to:
      receive a plurality of values and a plurality of keys from application A, where each value is paired with a respective key; and
      store the plurality of values and the plurality of keys registered to application A in the memory storage;
   wherein:
      a first communication is transmitted from application A to application B;
      the first communication contains one or more of the plurality of keys registered to application A; and
      the first communication is smaller than if it had contained corresponding values for the one or more of the plurality of keys registered to application A;
   wherein:
      a second communication is transmitted from application B to application C;
      the second communication contains one or more of the plurality of keys registered to application A; and
      the second communication is smaller than if it had contained corresponding values for the one or more of the plurality of keys registered to application A; and
   wherein:
      when rendering data to a user interface, the computer processor provides application B with values to one or more keys registered to application A found in the first communication.

3. A system for reducing a size of a communication between applications, the system comprising:
   a network;
   a computer processor running on the network;
   a memory storage;
   application A running on the network;
   application B running on the network; and
   application C running on the network;
   wherein the computer processor is configured to:
      receive a plurality of values and a plurality of keys from application A, where each value is paired with a respective key; and
      store the plurality of values and the plurality of keys registered to application A in the memory storage;
   wherein:
      a first communication is transmitted from application A to application B;
      the first communication contains one or more of the plurality of keys registered to application A; and
      the first communication is smaller than if it had contained corresponding values for the one or more of the plurality of keys registered to application A;
   wherein:
      a second communication is transmitted from application B to application C;
      the second communication contains one or more of the plurality of keys registered to application A; and
      the second communication is smaller than if it had contained corresponding values for the one or more of the plurality of keys registered to application A; and
   wherein:

values to one or more keys registered to application A is stored in a memory in proximity to application B, and application B looks up in the memory the values for keys found in the first communication.

\* \* \* \* \*